United States Patent [19]
Tanaka et al.

[11] Patent Number: 5,184,146
[45] Date of Patent: Feb. 2, 1993

[54] COLOR IMAGE FORMING METHOD AND APPARATUS

[75] Inventors: Kazuyoshi Tanaka; Toshifumi Isobe; Masahiko Itaya; Akiko Naganuma, all of Hachioji, Japan

[73] Assignee: Konica Corporation, Tokyo, Japan

[21] Appl. No.: 558,512

[22] Filed: Jul. 27, 1990

[30] Foreign Application Priority Data

Jul. 29, 1989 [JP] Japan .................................. 1-197836
Aug. 11, 1989 [JP] Japan .................................. 1-209257

[51] Int. Cl.⁵ .............................................. H04N 1/21
[52] U.S. Cl. .................................... 346/1.1; 346/108; 358/296; 358/75
[58] Field of Search ................... 346/108, 107 R, 160, 346/1.1; 358/75, 78, 80, 296, 300, 302

[56] References Cited

U.S. PATENT DOCUMENTS

| | | | |
|---|---|---|---|
| 4,977,448 | 12/1990 | Murata et al. | 358/75 |
| 5,016,097 | 5/1991 | Shimano | 358/75 |
| 5,065,234 | 11/1991 | Hung et al. | 358/80 |

FOREIGN PATENT DOCUMENTS 0271052 6/1988 European Pat. Off. .
2206261 12/1988 United Kingdom .

Primary Examiner—Mark J. Reinhart
Attorney, Agent, or Firm—Finnegan, Henderson, Farabow, Garrett and Dunner

[57] ABSTRACT

A color image forming method and apparatus for sequentially forming toner images of a plurality of colors on a photosensitive body so as to form a color toner image. The method and apparatus maintain a substantially constant developing bias so that a first exposure potential of a photosensitive surface and a second exposure potential of the photosensitive surface are substantially equal to one another.

13 Claims, 16 Drawing Sheets

FIG. 3A  FIG. 3B
PRIOR ART
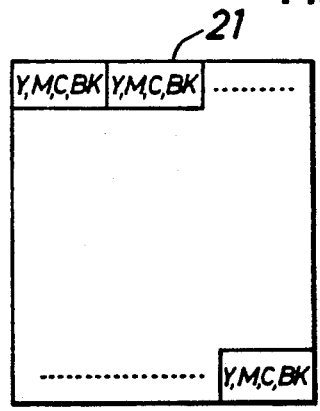
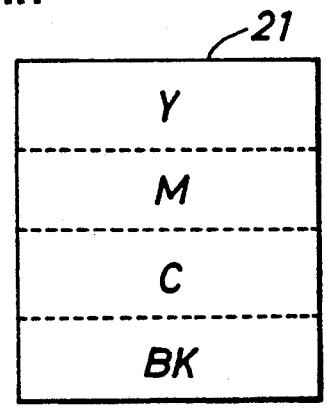
FIG. 5  PRIOR ART
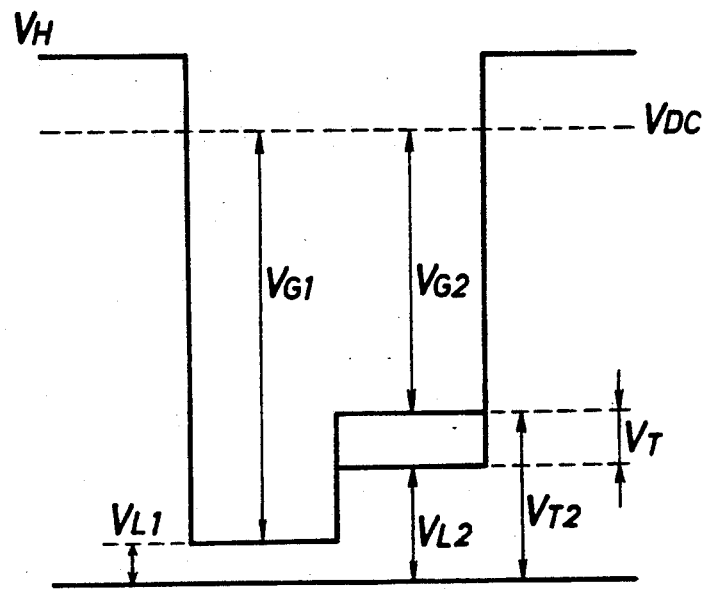

FIG. 4
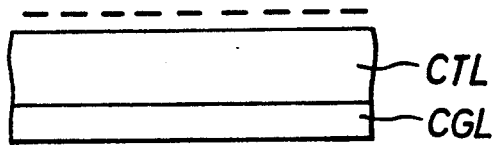
(A)
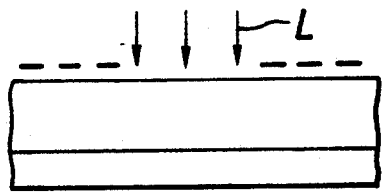
(B)
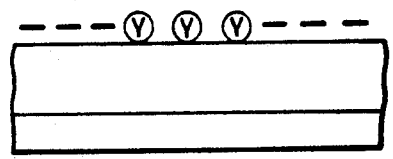
(C)
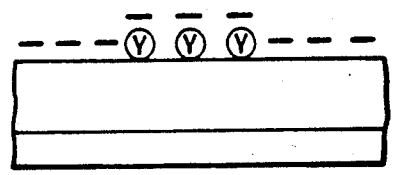
(D)
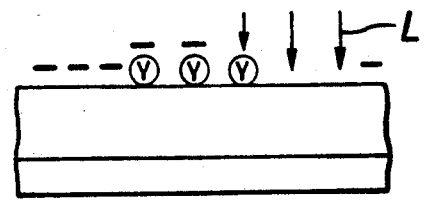
(E)
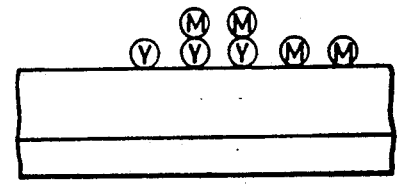
(F)
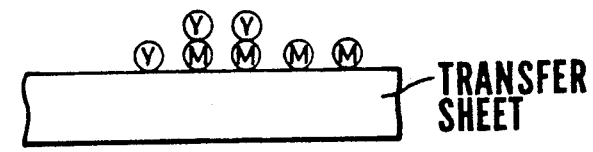
(G)

FIG. 7

| STEP \ DATA | Se 0 | Se 1 |
|---|---|---|
| YELLOW | 0 | 0 |
| MAGENTA | 0 | 1 |
| CYAN | 1 | 0 |
| BLACK | 1 | 1 |

FIG. 8

| INPUT DATA | | | YELLOW | | | MAGENTA | | | CYAN | | | BLACK |
|---|---|---|---|---|---|---|---|---|---|---|---|---|
| | COLOR IMAGE DATA | R | 1 | 1 | 0 | 1 | 1 | 0 | 0 | 0 | 0 | 0 |
| | | G | 1 | 0 | 1 | 0 | 0 | 0 | 1 | 1 | 0 | 0 |
| | | B | 0 | 0 | 0 | 1 | 0 | 1 | 1 | 0 | 1 | 0 |
| | COLOR SELECTION SIGNAL | Se0 | 0 | 0 | 0 | 0 | 0 | 0 | 1 | 1 | 1 | 1 |
| | | Se1 | 0 | 0 | 0 | 1 | 1 | 1 | 0 | 0 | 0 | 1 |
| OUTPUT DATA | OUT 0 | | 0 | 0 | 0 | 0 | 1 | 0 | 0 | 1 | 1 | 0 |
| | OUT 1 | | 1 | 1 | 1 | 1 | 1 | 1 | 1 | 1 | 1 | 1 |

FIG. 10

| | | | YELLOW | | | MAGENTA | | | CYAN | | | BLACK |
|---|---|---|---|---|---|---|---|---|---|---|---|---|
| INPUT DATA | COLOR IMAGE DATA | Y | 1 | 1 | 1 | 0 | 1 | 0 | 0 | 1 | 0 | 0 |
| | | M | 0 | 1 | 0 | 1 | 1 | 1 | 0 | 0 | 1 | 0 |
| | | C | 0 | 0 | 1 | 0 | 0 | 1 | 1 | 1 | 1 | 0 |
| | | K | 0 | 0 | 0 | 0 | 0 | 0 | 0 | 0 | 0 | 1 |
| | COLOR SELECTION SIGNAL | Se 0 | 0 | 0 | 0 | 0 | 0 | 0 | 1 | 1 | 1 | 1 |
| | | Se 1 | 0 | 0 | 0 | 1 | 1 | 1 | 0 | 0 | 0 | 1 |
| OUTPUT DATA | | OUT 0 | 0 | 0 | 0 | 0 | 1 | 0 | 0 | 1 | 1 | 0 |
| | | OUT 1 | 1 | 1 | 1 | 1 | 1 | 1 | 1 | 1 | 1 | 1 |

FIG. 18

| | | YELLOW | | | | MAGENTA | | | | CYAN | | | | BLACK | | | | |
|---|---|---|---|---|---|---|---|---|---|---|---|---|---|---|---|---|---|---|
| INPUT DATA | Color Image Data | Y | 1 | 1 | 1 | 1 | 1 | 1 | 1 | 1 | 1 | 1 | 1 | 1 | 1 | 1 | 1 | 1 |
| | | M | 1 | 1 | 0 | 0 | 1 | 1 | 1 | 0 | 1 | 1 | 0 | 0 | 1 | 0 | 1 | 1 |
| | | C | 0 | 1 | 1 | 0 | 1 | 0 | 1 | 1 | 0 | 1 | 1 | 1 | 0 | 1 | 0 | 1 |
| | | BK | 1 | 1 | 1 | 1 | 1 | 1 | 1 | 1 | 1 | 1 | 1 | 1 | 1 | 1 | 1 | 0 |
| | Color Selection Signal | | 0 | 0 | 0 | 0 | 0 | 1 | 0 | 0 | 1 | 0 | 0 | 1 | 1 | 1 | 1 | 1 |
| | | | 0 | 0 | 0 | 0 | 1 | 1 | 0 | 1 | 1 | 0 | 0 | 1 | 1 | 1 | 1 | 1 |
| OUTPUT DATA | | | $F_w \cdot 1/n$ | " | " | " | $F_w$ | " | $F_w \cdot 1/n$ | $F_w \cdot 1/n$ | $F_w$ | " | $F_w \cdot 1/n$ | $F_w \cdot 1/n$ | " | " | " | " |

COLOR IMAGE FORMING METHOD AND APPARATUS

BACKGROUND OF THE INVENTION

1. Field of the Invention

The present invention relates to a color image forming method and apparatus for sequentially forming toner images of a plurality of colors on a photosensitive body so as to form a color toner image.

2. Description of the Prior Art

In an image forming apparatus based on electrophotography or electrostatic recording, an electrostatic latent image is formed on a photosensitive body, and is developed by a toner as charged particles. A color image and a composite image (an overlap of a plurality of documents or an overlap of image data and a document image) are obtained by utilizing the above-mentioned principle in the following manner. The cycle of charging, image exposure, and developing is repeated twice or more on a photosensitive body having a photoconductive layer on a conductive substrate (e.g., Japanese Patent Application No. 53-184381). In another method, a photosensitive body having a transparent insulating layer formed outside a photoconductive layer is used, and the cycle of primary charging, secondary charging, image exposure, uniform exposure, and developing is repeated twice or more. In still another method, the cycle of primary charging, secondary charging, image exposure, and developing is performed twice or more (e.g., Japanese Patent Application No. 58-183152). In each image forming method described above, color developing and overlapping of images can be performed on the photosensitive body. Since these overlapping images can be transferred onto a transfer medium by one transfer process, a color image and a composite image can be obtained by an apparatus having a simple arrangement.

The above-described image forming process is realized by a developing method in which, for example, a developing agent consisting of a nonmagnetic toner and a magnetic carrier is used and developing is performed under conditions described in Japanese Patent Application No. 58-57446 or 60-192712. In a developing unit, the developing agent is agitated, and the toner is negatively charged. The charged toner is then attracted to the magnetic carrier surface by static electricity. The developing agent in which the toner is electrostatically coupled to the carrier is magnetically attracted to a developing sleeve surface and is transferred to a developing region while it is rotated at a predetermined linear velocity. This developing method is a kind of magnetic brush developing method, and is characterized in that only the toner is caused to fly to a latent image surface of the photosensitive body by an AC bias without bringing the magnetic brush into contact with the photosensitive body.

According to an image forming apparatus suitable for the above-described image forming process and developing method, latent images are formed by a latent image forming means in units of colors, and developing is performed by developing units using toners of colors corresponding to the respective latent images.

In a typical image forming apparatus of this type, an electrostatic latent image is formed by radiating a light beam such as a laser beam on a photosensitive body having a photoconductive substance on a conductive substrate.

FIG. 1 shows a schematic arrangement of a conventional color image forming apparatus of this type.

Referring to FIG. 1, reference numeral 1 denotes a drum-like photosensitive body which has a photoconductive layer on a conductive substrate and is rotated at a predetermined angular velocity in a direction indicated by an arrow; 2, an image exposure unit for performing image exposure of the uniformly-charged surface of the photosensitive body 1; 3, a scorotron charger for uniformly charging the surface of the photosensitive body 1; 4a, 4b, 4c, and 4d, developing units respectively storing yellow, magenta, cyan, and black toners together with a nonmagnetic carrier; 5, a paper feed tray on which transfer sheets P are placed; 6, a pre-transfer exposure lamp for exposing the surface of the photosensitive body 1 on which a color toner image or a composite toner image is formed; 7, a transfer unit for transferring the toner image onto the transfer sheet P upon discharging; 8, a separator for separating the transfer sheet P from the surface of the photosensitive body 1; 9, a conveyor belt for conveying the transfer sheet P, onto which the toner image was transferred, to a fixing unit 10 upon separation; 10, the fixing unit for fixing the toner image on the transfer sheet; 11, a cleaning discharger for discharging the photosensitive body 1 upon transfer; and 12, a cleaning unit for removing the residual toner on the surface of the photosensitive body 1 by using a blade 12a, a bias roller 12b, and a cleaning roller 12c which have been set in an inoperative state during toner image formation, thus making the apparatus ready for the next color image formation.

Each of the developing units 4a to 4d includes the following components in its developing tank: first and second agitating members, a feed roller, a scraper, a thin-layer forming plate, and a developing agent carrier. The developing agent carrier is arranged near the photosensitive body 1. In order to prevent fogging, the apparatus includes a developing bias circuit for applying a bias voltage to the sleeve through a protective resistor. The developing bias circuit includes an AC power source for supplying an AC bias to cause oscillation between the sleeve and the photosensitive body in a developing region, and a high-voltage DC power source for supplying a DC bias. With this arrangement, the developing bias circuit generates an oscillating electric field between the sleeve and the photosensitive body. Since developing agent particles oscillate between the sleeve and the photosensitive body, a toner image can be formed on the photosensitive body by toner particles without much contact between the developing agent and the photosensitive body.

FIG. 2 shows a detailed arrangement of the image exposure unit 2 (enclosed with a dotted line).

Referring to FIG. 2, reference numeral 21 denotes a frame memory. Yellow, magenta, cyan, and black image data Y, M, C, and BK each corresponding to one frame are written in the frame memory 21. In this case, for example, a packed pixel format shown in FIG. 3A or a planar pixel format shown in FIG. 3B is available as a recording format. In the packed pixel format, the image data Y, M, C, and BK are stored in units of pixels. In the planar pixel format, the image data Y, M, C, and BK are respectively stored in different regions.

As described above, in the step of forming a yellow toner image, the yellow data Y are sequentially read out from the frame memory 21 and are supplied to a laser driver 22. A semiconductor laser 23 is driven on the basis of the yellow image data Y. Image exposure light L output from the semiconductor laser 23 is radiated onto the photosensitive body 1, which is uniformly changed in advance, through a rotating polygon mirror 24 for deflection and an f-θ lens 25 for focusing. As a result, a latent image corresponding to the yellow image data Y is formed on the photosensitive body 1. This image is then developed by the developing unit A to form a yellow toner image.

In the step of forming a magenta toner image, the magenta data M are sequentially read out from the frame memory 21 and are supplied to the laser driver 22. The semiconductor laser 23 is driven on the basis of the magenta image data M. The image exposure light L output from the semiconductor laser 23 is radiated onto the photosensitive body 1, which is uniformly changed in advance, through the rotating polygon mirror 24 for deflection and the f-θ lens 25 for focusing. As a result, a latent image corresponding to the magenta image data M is formed on the photosensitive body 1. This image is then developed by the developing unit B to form a magenta toner image.

Subsequently, the same operation as described is performed in the steps of forming cyan and black toner images. As a result, latent images respectively corresponding to the cyan and black image data C and BK are formed on the photosensitive body 1. These images are then developed by the developing units C and D, respectively, and cyan and black toner images are formed.

A color toner image formed on the photosensitive body 1 will be considered.

A color image is formed in a toner image forming process shown in FIGS. 4(A) to 4(G).

FIGS. 4(A) to 4(F) are views for explaining the color image forming process in which toner images are caused to overlap on a photosensitive body by repeatedly performing image exposure and developing. In this case, the photosensitive body is a drum-like organic photoconductor obtained by forming a charge generating layer (to be referred to as a CGL hereinafter) on a conductive substrate consisting of Al (aluminum) or the like. The substrate is grounded. The CTL and CGL are constituted by dielectric materials.

As shown in FIG. 4(A), charges (negative charges in this case) are uniformly distributed on the surface of the photosensitive body upon scorotron discharging by means of a scorotron discharger in order to set a uniform surface potential. With this operation, the CTL and the CGL as dielectric materials of the photosensitive body are subjected to dielectric polarization.

Subsequently, an electrostatic latent image is formed by radiating a laser beam from the laser exposure unit. Upon radiation of the laser beam, as shown in FIG. 4(B), charges are generated in the CGL, and the energy in the CTL is enhanced by the laser beam. As a result, holes as positive charges generated in the CGL are moved and attracted to negative charges on the photosensitive body surface so as to be electrically neutralized. At this time, the potential of the photosensitive body surface on which the electrostatic latent image is formed is changed to an exposure potential $V_L$ corresponding to the amount of laser beam. As a result, a developing potential gap $V_G$ is generated, which corresponds to a potential difference between the exposure potential $V_L$ and a surface potential $V_{DC}$ of the developing sleeve based on a DC bias supplied from a developing bias circuit of a developing unit. Since an electric flux generated by this developing potential gap $V_G$ flows from the latent image surface of the photosensitive body surface to the developing sleeve surface, toner particles (e.g., yellow toner particles) as negatively charged particles are attracted by the electrical force directed to the latent image portion of the photosensitive body surface. However, the above-mentioned force is not large enough to separate the toner particles as charged particles from the magnetic carrier, to which the toner particles are coupled by static electricity. When an oscillating electric field is generated between the developing sleeve and the photosensitive body by applying an AC bias from the developing bias circuit, particles of the developing agent carried on the developing sleeve surface by a magnetic force oscillate between the sleeve and the photosensitive body. As a result, the coupling force of the toner as the charged particles and the magnetic carrier is weakened, and the toner particles as the negatively charged particles fly to the electrostatic latent image formed on the photosensitive body surface owing to an electrical force, and are electrostatically attracted to the electrostatic latent image. In this manner, as shown in FIG. 4(C), the toner particles (yellow) as negatively charged particles are electrostatically attracted to the electrostatic latent image on the photosensitive body so as to perform developing, thus forming a first toner (yellow) image.

As shown in FIG. 4(D), for the next latent image forming operation, the surface of the photosensitive body on which the toner (yellow) layer is formed by the above-described first developing operation is recharged by uniformly distributing negative charges on the surface upon scorotron discharging by the charger.

The second image exposure light is radiated from the laser exposure unit so as to form the second latent image on the photosensitive body surface. More specifically, as shown in FIG. 4(E), charges are generated in the CGL upon radiation of the laser beam, and the energy in the CTL is enhanced by the laser beam. As a result, holes as positive charges generated in the CGL are moved and attracted to negative charges on the photosensitive body surface so as to be electrically neutralized. At this time, a developing potential gap $V_G$ is generated, which corresponds to a potential difference between a surface potential $V_{DC}$ of the developing sleeve and the exposure potential $V_L$. Since an electric flux generated by this developing potential gap $V_G$ flows from the latent image surface of the photosensitive body surface to the developing sleeve surface, toner particles as negatively charged particles are attracted by the electrical force directed to the latent image portion of the photosensitive body surface. However, the above-mentioned force is not large enough to separate the toner particles as charged particles from the magnetic carrier, to which the toner particles are coupled by static electricity. When an oscillating electric field is generated between the developing sleeve and the photosensitive body by applying an AC bias from the developing bias circuit, particles of the developing agent carried on the developing sleeve surface by a magnetic force oscillate between the sleeve and the photosensitive body. As a result, the coupling force of the toner as the charged particles and the magnetic carrier is weakened, and the toner particles (e.g., magenta) as the negatively charged particles fly to the electrostatic latent image formed on the photosensitive body surface owing to the above-described electrical force, and are electrostatically attracted to the electrostatic latent image. In this manner, as shown in FIG. 4(F), the toner particles (magenta) as negatively charged particles are electrostatically attracted to the electrostatic latent image on the photosensitive body so as to perform developing, thus forming a second toner (magenta) image.

Subsequently, the same process is performed a required number of times in order to obtain a color toner image or a composite image. This image is then transferred onto a transfer member, and is heated or pressurized to fix the image. With this operation, a color image is obtained.

FIG. 5 shows the potential of the photosensitive body surface in the first and second image exposures in the above-described color image forming process.

When the second latent image is formed on the photosensitive body surface by the second image exposure, since the surface potential of the first toner layer is decreased to only a toner layer surface potential $V_{T2}$, a developing potential gap $V_{GN}$ in the second and subsequent image exposures is smaller than a first developing potential gap $V_{G1}$.

This is because a toner layer formed on the photosensitive body surface blocks a laser beam to reduce the amount of laser beam radiated on the photosensitive body surface, and the surface potential of the photosensitive body cannot be decreased to an exposure potential $V_{L1}$ but is decreased only to a re-exposure potential $V_{L2}$. In addition, in the toner layer formed by the first developing operation, the charge amount of the negatively charged particles corresponds to a potential $V_T$ obtained by subtracting the re-exposure potential $V_{L2}$ from the toner layer surface potential $V_{T2}$. Therefore, the surface potential of the second electrostatic latent image formed on the photosensitive body surface is increased.

Since the re-exposure potential $V_{L2}$ on the photosensitive body surface is enhanced to be higher than the first exposure potential $V_{L1}$ by a potential corresponding to a potential distribution based on the light-shielding properties of the toner layer and the charge amount of the toner itself as charged particles, the second toner (magenta) layer attached to the photosensitive body surface due to the developing gap G2 as the potential difference between the surface potential $V_{DC}$ of the developing sleeve and the re-exposure potential $V_{L2}$ is thinner than the first toner (yellow) layer. Hence, proper color reproduction cannot be performed. In addition, the above-mentioned tendency becomes more conspicuous with an increase in number of toner layer to be stacked.

Assume that a color toner image is finally formed on the photosensitive body 1 as shown in FIG. 4(F). If this color toner image is transferred onto a transfer sheet P, the lowermost layer on the photosensitive body 1 becomes the uppermost layer on the transfer sheet P, as shown in FIG. 4(G).

As a result, in a region where the first toner (yellow) layer and the second toner (magenta) layer overlap, the first toner layer is located at the upper position.

In a region where the first toner (yellow) layer and the second toner (magenta) layer overlap, red is to be reproduced. However, a corresponding portion on the transfer sheet P as a printout becomes yellowish because the yellow component becomes stronger than the magenta component for the above-described reason.

Such a problem will be posed in any portion in which toner images of a plurality of colors overlap. According to the conventional image forming apparatus, therefore, an image having a proper color tone represented by the image data Y, M, C, and K cannot be formed.

In addition, a television signal is expressed by red, green, and blue image data. However, when an image is to be formed in the above-described manner, yellow, magenta, cyan, and black image data are required. That is, in order to form an image by using a television signal, yellow, magenta, cyan, and black image data must be obtained from red, green, and blue image data. In order to perform such color conversion, a data converter is required.

SUMMARY OF THE INVENTION

It is the first object of the present invention to provide a color image forming method in which a plurality of toner layers are uniformly formed by eliminating the influences of the charge amounts of the toner layers themselves and their light-shielding properties.

It is the second object of the present invention to provide a color image forming apparatus which can form an image having a proper color tone represented by image data.

It is the third object of the present invention to provide a color image forming apparatus which can use image data of red, green, and blue, and can form an image having a proper color tone.

In order to achieve the first object, there is provided according to the present invention a color image forming method comprising the steps of uniformly charging a photosensitive body surface, forming an electrostatic latent image by radiating a laser beam from exposure means in accordance with color image data of a plurality of colors for reproducing a color of one pixel and a color selection signal for selecting one color image data of the color image data of the plurality of colors which are supplied from image data storage means, and obtaining toner layers of a plurality of colors by repeating a developing operation, wherein a developing bias is set to be constant so as to set a first exposure potential and a re-exposure potential to be equal to each other.

In addition, the effect of the present invention can be enhanced by setting the laser power radiated from the first exposure operation to be 50% or less of the laser power radiated from the re-exposure operation.

In order to achieve the second object of the present invention, there is provided according to the present invention a color image forming apparatus comprising image data output means for concurrently outputting image data of a plurality of colors in each step of forming a color image of a selected color, and image data converting means for receiving the image data of the plurality of colors and color selection data from the image data output means, and outputting image data corrected to form a proper color image, wherein each color output means is driven on the basis of the image data from the image data converting means.

In order to achieve the third object, there is provided according to the present invention a color image forming apparatus comprising image data output means for concurrently outputting image data of red, green, and blue as three primary colors used for additive color mixture in each step of forming a color image of a selected color, and image data converting means for receiving the image data of red, green, and blue and color selection data from the image output means, and outputting image data corrected to form proper color images of yellow, magenta, and cyan in the steps of forming color images of yellow, magenta, and cyan, wherein each color output means is driven in accordance with the image data from the image converting means.

BRIEF DESCRIPTION OF THE DRAWINGS

FIGS. 3A and 3B show different storage formats of a frame memory;

FIG. 4(A) to 4(G) are views showing the steps of forming a color toner image;

FIG. 5 is a graph showing a potential distribution on a photosensitive body surface after re-charge/re-exposure in a conventional color image forming process;

FIG. 7 is a table showing color selection data;

FIG. 8 is a table showing a combination of input and output data written in a look-up table according to an embodiment of the present invention;

FIG. 10 is a view showing a look-up table in the image exposure unit in FIG. 9;

FIG. 18 is a view showing a look-up table used for the image exposure unit of the color image forming apparatus of the present invention.

DETAILED DESCRIPTION OF THE PREFERRED EMBODIMENTS

Figure 1:
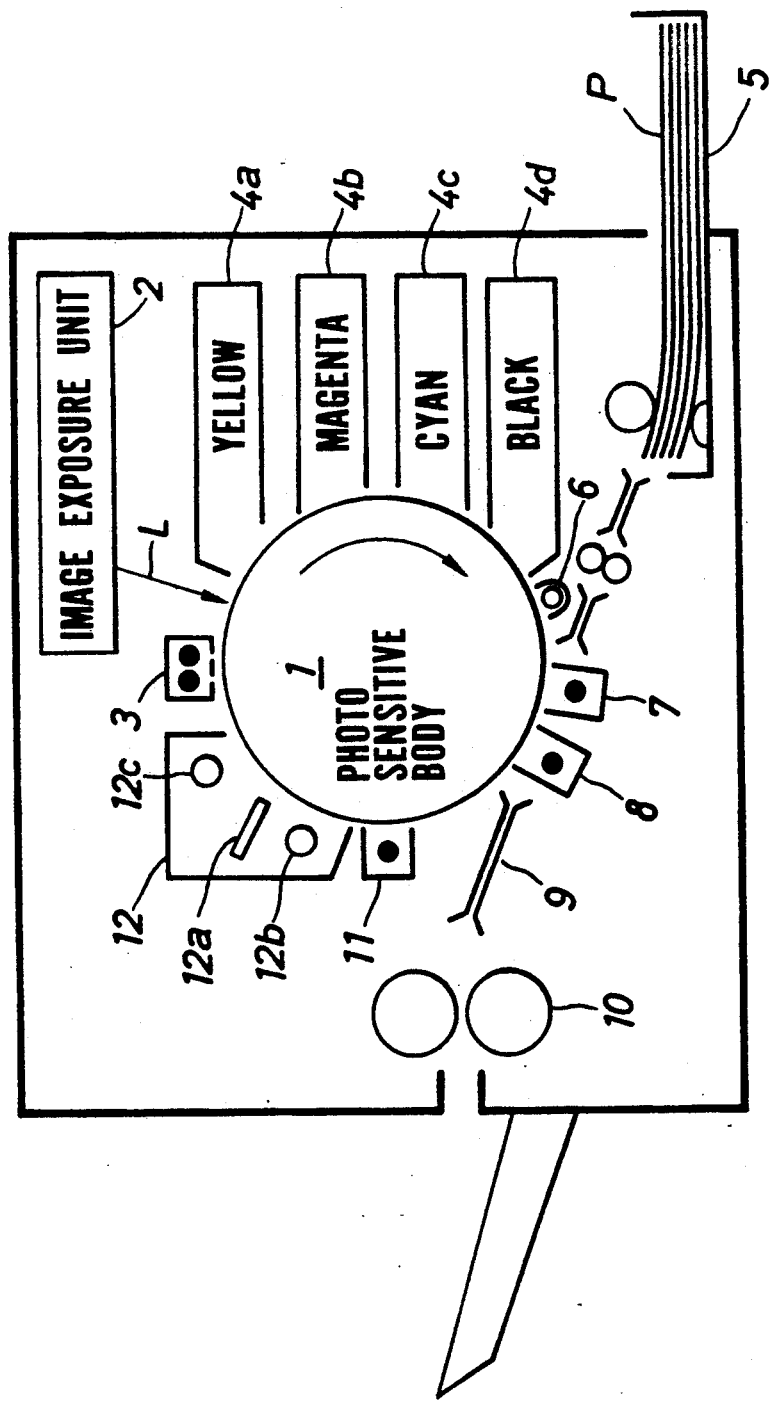
FIG. 1 is a block diagram showing a schematic arrangement of a conventional color image forming apparatus.
Figure 2:
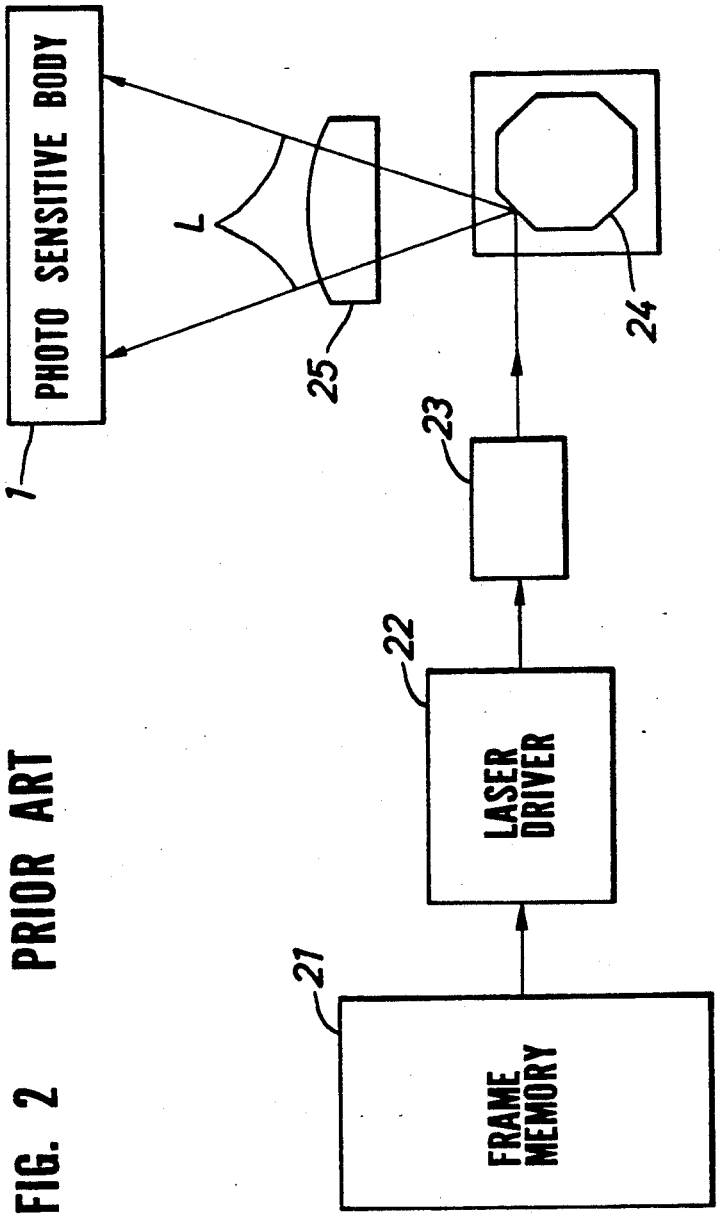
FIG. 2 is a block diagram showing a schematic arrangement of an image exposure unit in the color image forming apparatus in FIG. 1.
Figure 6:
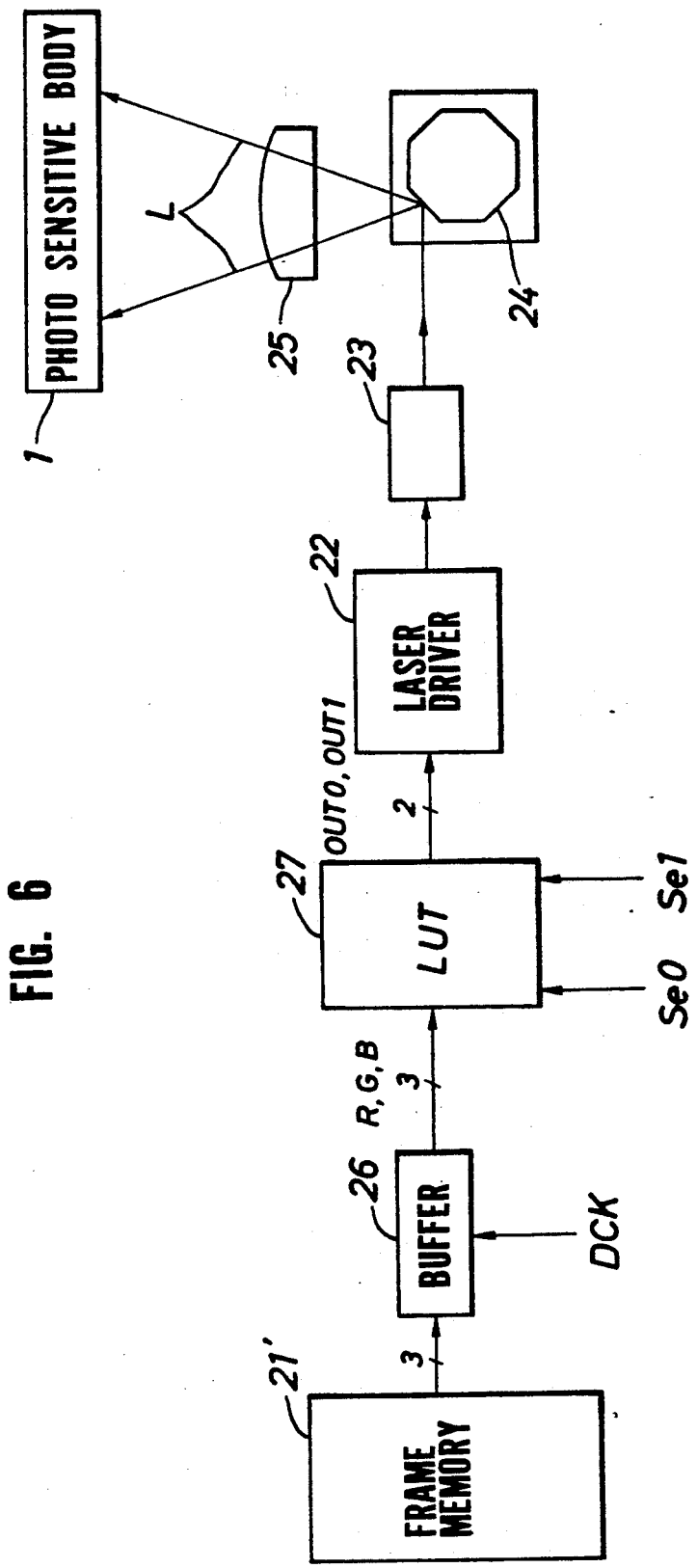
FIG. 6 is a block diagram showing a schematic arrangement of an image exposure unit of a color image forming apparatus to which a color image forming method of the present invention is applied.

The present invention will be described below with reference to the accompanying drawings A color image forming apparatus of the present invention basically has the same arrangement as shown in FIG. 1. FIG. 6 is a block diagram showing an arrangement of an image exposure unit of the apparatus.

Referring to FIG. 6, one-frame red, green, and blue image data R, G, and B are written in a frame memory 21' in accordance with a packed pixel format or a planar pixel format.

In the steps of forming toner images of yellow, magenta, cyan, and black, the image data R, G, and B are concurrently read out from the frame memory 21' for each pixel and are supplied to a buffer 26. In this case, the image data R, G, and B are respectively constituted by one-bit (binary) data, and are supplied to the buffer 26 as three-bit parallel data.

The buffer 26 is constituted by, e.g., a FIFO having a capacity of one line. A dot clock DCK is supplied to this buffer 26. The image data R, G, and B for each pixel are concurrently output from the buffer 26 in synchronism with the dot clock DCK.

The image data R, G, and B output from the buffer 26 are supplied as an address signal to an LUT (look-up table) 27 constituted by a ROM, a RAM, or the like. In addition, color selection data Se0 and Se1 of two bits are supplied as an address signal to a printer sequence controller (not shown). These color selection data Se0 and Se1 indicate a specific step of the steps of forming yellow, magenta, cyan, and black toner images, and are set as shown in, e.g., FIG. 7.

In addition, image data OUT0 and OUT1 of two bits are stored in the LUT 27 in advance. The image data OUT0 and OUT1 are to be newly output in each of the steps of forming yellow, magenta, cyan, and black toner images in accordance with each combination of the image data R, G, and B. These image data OUT0 and OUT1 are obtained by converting the image data R, G, and B so as to balance the respective color components of a pixel in which toner images of a plurality of colors overlap. That is, the data conversion is performed to emphasize the color component of a toner image to be formed later.

Predetermined image data OUT0 and OUT1 are selected and output from the LUT 27 on the basis of the color selection data Se0 and Se1 and the image data R, G, and B. FIG. 8 shows the image data OUT0 and OUT1 to be output from the LUT 27 as an example.

The image data OUT01 and OUT1 output from the LUT 27 are supplied to a laser driver 22. A semiconductor laser 23 is driven on the basis of the image data OUT0 and OUT1.

The apparatus of this embodiment has the above-described arrangement. Other portions of this apparatus are the same as those of the apparatus shown in FIG. 1.

In this embodiment, in the step of forming a yellow toner image, the image data R, G, and B are concurrently supplied from the frame memory 21' to the LUT 27 together with the color selection data Se0=0 and Se1=0 indicating the yellow toner image forming step. The corrected image data OUT0 and OUT1 for outputting a yellow image are supplied from the LUT 27 to the laser driver 22. As a result, a latent image corresponding to the image data OUT0 and OUT1 is formed on a photosensitive body 1. This image is then developed by a developing unit A, and a yellow toner image is formed.

In the step of forming a magenta toner image, the image data R, G, and B are concurrently supplied from the frame memory 21' to the LUT 27 together with the color selection data Se0=0 and Se1=1 indicating the magenta toner image forming step. The corrected image data OUT0 and OUT1 for outputting a magenta image are supplied from the LUT 27 to the laser driver 22. As a result, a latent image corresponding to the image data OUT0 and OUT 1 is formed on the photosensitive body 1. This image is then developed by a developing unit B, and a magenta toner image is formed.

Subsequently, the same operation as described above is performed in the steps of forming cyan and black toner images. As a result, latent images corresponding to the image data OUT0 and OUT1, which are respectively corrected to output cyan and black images, are formed on the photosensitive body 1. These latent images are developed by developing units C and D, and cyan and black toner images are formed.

As described above, according to the present invention, toner images of the respective colors are formed on the basis of the image data OUT0 and OUT1 obtained by converting the image data R, G, and B so as to balance the respective color components of a pixel in which toner images of a plurality of colors overlap. Therefore, an image having a proper color tone represented by the imaged data R, G, and B can be formed.

Assume that a red output is to be obtained as shown in FIGS. 4(A) to 4(G). In a pixel portion in which yellow and magenta toner particles overlap, Se0 and Se1=[0, 0], and R, G, and B=[1, 0, 0] in the step of forming a yellow toner image. Therefore, the image data OUT0 and OUT1=[0, 1]. In this case, the laser power is set to be, e g., ½ the full power. In the step of forming a magenta toner image, since Se0 and Se1=[0, 1], and R, G, and B=[1, 0, 0], the image data OUT0 and OUT1=[1, 1]. As a result, the laser power is set to be, e.g., the full power. With this operation, in the pixel portion in which the yellow and magenta toner particles overlap, the intensity of magenta is increased to prevent the portion to be colored in red from becoming yellowish. Note that the laser power is adjusted by, e.g., ON-duty control.

In this embodiment, since the image data R, G, and B are converted into image data Y, M, C, and K by the LUT 27, no image data converter is required. For example, red, green, and blue image data R, G, and B of television signals can be used without an image data converter.

In the above embodiment, the image data R, G, and B are constituted by binary data. However, the number of bits is not limited to the above-mentioned number. In addition, the image data OUT0 and OUT1 of two bits are output from the LUT 27. However, the present invention is not limited to this. The correction precision of a color tone can be increased with an increase in the number of bits of image data R, G, and B output to the LUT 27 and an increase in the number of bits of image data output from the LUT 27.

In the above embodiment, the color image forming method includes the step of forming a black toner image. However, the present invention can be equally applied to a method including only the yellow, magenta, and cyan toner image forming steps. In this case, image data R, G, and B are converted into image data Y, M, and C by the LUT 27.

Furthermore, in the above embodiment, the exposing means is constituted by the semiconductor laser 23. However, the exposing means may be constituted by other light-emitting elements such as a light-emitting diode.

Figure 9:
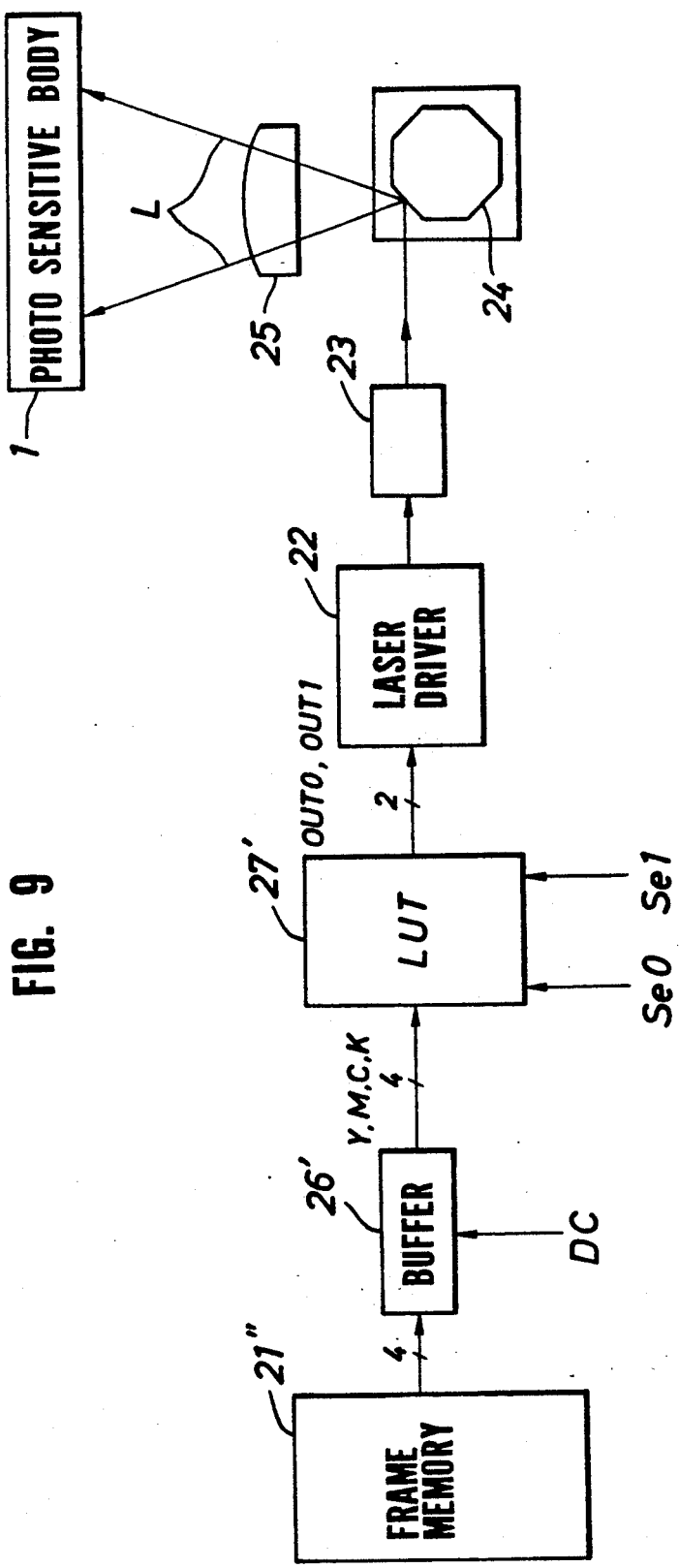
FIG. 9 is a block diagram showing a schematic arrangement of an image exposure unit, as another embodiment, used for the color image forming apparatus of the present invention.

FIG. 9 is a block diagram showing an image exposure unit as another embodiment in the color image forming apparatus of the present invention. The same reference numerals in FIG. 9 denote the same parts as in FIG. 6.

In the embodiment shown in FIG. 6, one-frame image data R, G, and B are written in the frame memory 21'. In contrast to this, in this embodiment, one-frame yellow, magenta, cyan, and black image data Y, M, C, and BK are written in a frame memory 21".

In this embodiment, therefore, the image data Y, M, C, and BK are concurrently read out from the frame memory 21" for each pixel and are supplied to a buffer 26' in each of the steps of forming yellow, magenta, cyan, and black toner images. In this case, the image data Y, M, C, and BK respectively consist of one-bit (binary) data, and are supplied to the buffer 26' as four-bit parallel data.

The buffer 26' has the same arrangement as that of the buffer 26 and receives a dot clock DCK. The data Y, M, C, and BK are concurrently output from the buffer 26' in synchronism with this dot clock DCK.

The image data Y, M, C, and BK output from the buffer 26' are supplied as an address signal to an LUT (look-up table) 27' constituted by a ROM, a RAM, or the like. In addition, color selection data Se0 and Se1 of two bits are supplied as an address signal from a printer sequence controller (not shown) to the LUT 27'. These color selection data Se0 and Se1 indicate a specific step of the steps of forming yellow, magenta, cyan, and black toner images, and are set as shown in, e.g., FIG. 7.

In addition, image data OUT0 and OUT1 of two bits are stored in the LUT 27' in advance. The image data OUT0 and OUT1 are to be output from the LUT 27' in accordance with each combination of the image data Y, M, C, and BK in each of the steps of forming yellow, magenta, cyan, and black toner images. These image data OUT0 and OUT1 are obtained by converting the image data Y, M, C, and BK of the respective colors so as to balance the respective color components of a pixel portion in which toner images of a plurality of colors overlap. That is, the image data conversion is performed to emphasize the color component of a toner image to be formed later.

Predetermined image data OUT0 and OUT1 are selected and output from the LUT 27' on the basis of the color selection data Se0 and Se1 and the image data Y, M, C, and BK. FIG. 10 shows the image data OUT0 and OUT1, as an example, to be output from the LUT 27'.

The image data OUT0 and OUT1 output from the LUT 27' are supplied to a laser driver 22. A semiconductor laser 23 is driven on the basis of the image data OUT0 and OUT1.

The same image forming process as in the embodiment shown in FIG. 6 is performed in this embodiment. In the step of forming a yellow toner image, the image data Y, M, C, and BK are concurrently supplied from the frame memory 21" to the LUT 27' together with the color selection data Se0=0 and Se1=0 indicating the yellow toner image forming step. The image data OUT0 and OUT1 obtained by converting the yellow image data Y are supplied from the LUT 27' to the laser driver 22. As a result, a latent image corresponding to the image data OUT0 and OUT1 is formed on a photosensitive body 1. This image is then developed by a developing unit A, and a yellow toner image is formed.

In the step of forming a magenta image, the image data Y, M, C, and BK are concurrently supplied from the frame memory 21" to the LUT 27' together with the color selection data Se0=0 and Se1=1. The image data OUT0 and OUT1 obtained by converting the magenta image data M are supplied from the LUT 27' to the laser driver 22. As a result, a latent image corresponding to the image data OUT0 and OUT1 is formed on the photosensitive body 1. This image is then developed by a developing unit B, and a magenta toner image is formed.

Subsequently, the same operation as described above is performed in the steps of forming cyan and black images. As a result, latent images corresponding to the image data OUT0 and OUT1 obtained by converting the cyan and black image data C and BK are formed on the photosensitive body 1. These images are respectively developed by developing units C and D, and cyan and black toner images are formed.

That is, the parallel image data Y, M, C, and BK corresponding to four frames are repeatedly supplied from the frame memory 21" in the image forming sequence.

As described above, according to the present invention, toner images of the respective colors are formed on the basis of the image data OUT0 and OUT1 obtained by converting the image data Y, M, C, and BK so as to balance the respective color components of a pixel portion in which toner images of a plurality of colors overlap. Therefore, an image having a proper color tone defined by the image data Y, M, C, and BK can be obtained.

Figure 11:
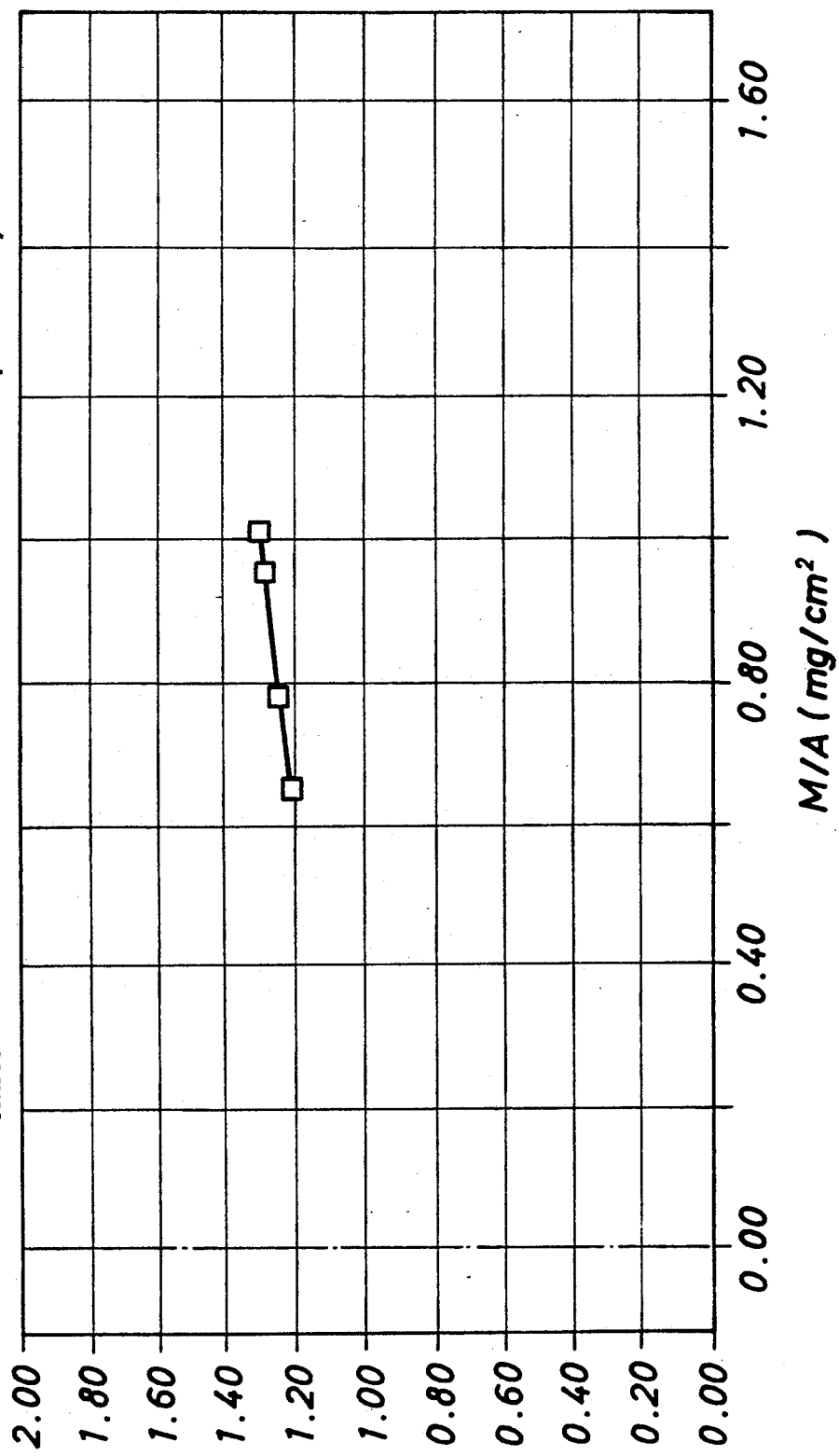
FIG. 11 is a graph showing a relationship between a toner attaching amount per unit area and an image density in a case wherein a toner image is formed on a photosensitive body surface by using a yellow toner.
Figure 12:
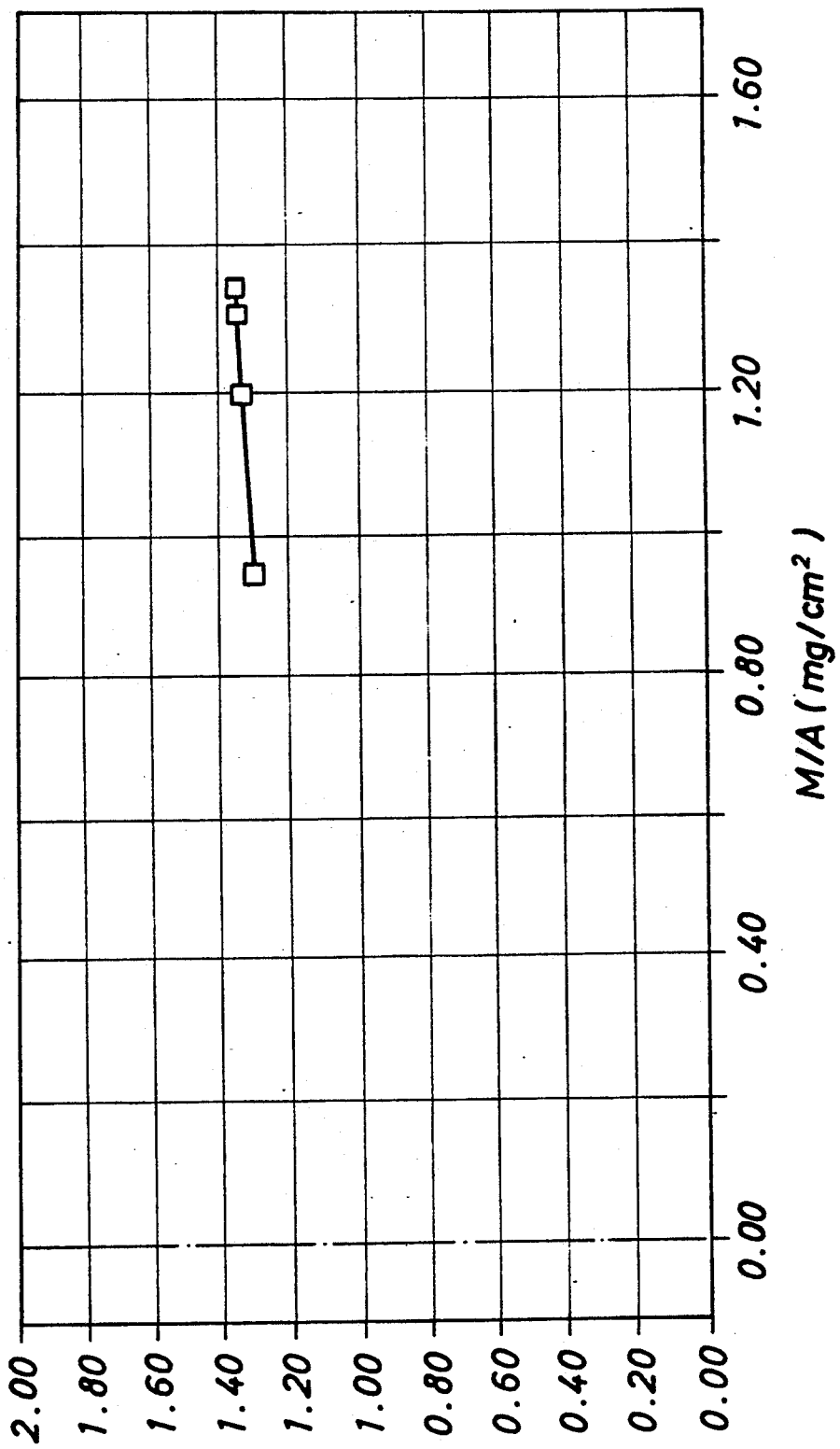
FIG. 12 is a graph showing a relationship between a toner attaching amount per unit area and an image density in a case wherein a toner image is formed on the photosensitive body surface by using a magenta toner.

In the above-described second embodiment, FIG. 11 is a graph showing a relationship between a toner attaching amount per unit area and an image density in a case wherein a toner image is formed on the surface of the photosensitive body by using a yellow toner. FIG. 12 is a graph showing a relationship between a toner attaching amount per unit area and an image density in a case wherein a toner image formed on the surface of the photosensitive body by using a magenta toner.

Referring to the graphs, in order to obtain an image density of 1.20 D in a single color by using each of the yellow and magenta toners, a toner attaching amount of 0.8 mg/cm$^2$ is required. Each image density is saturated near 1.40 D. At this time, each toner attaching amount is about 1.0 mg/cm$^2$ or more.

Color differences obtained when red is reproduced by subtractive color mixture of yellow and magenta toners will be considered on the basis of data obtained by an experiment conducted by the present inventor.

Figure 13:
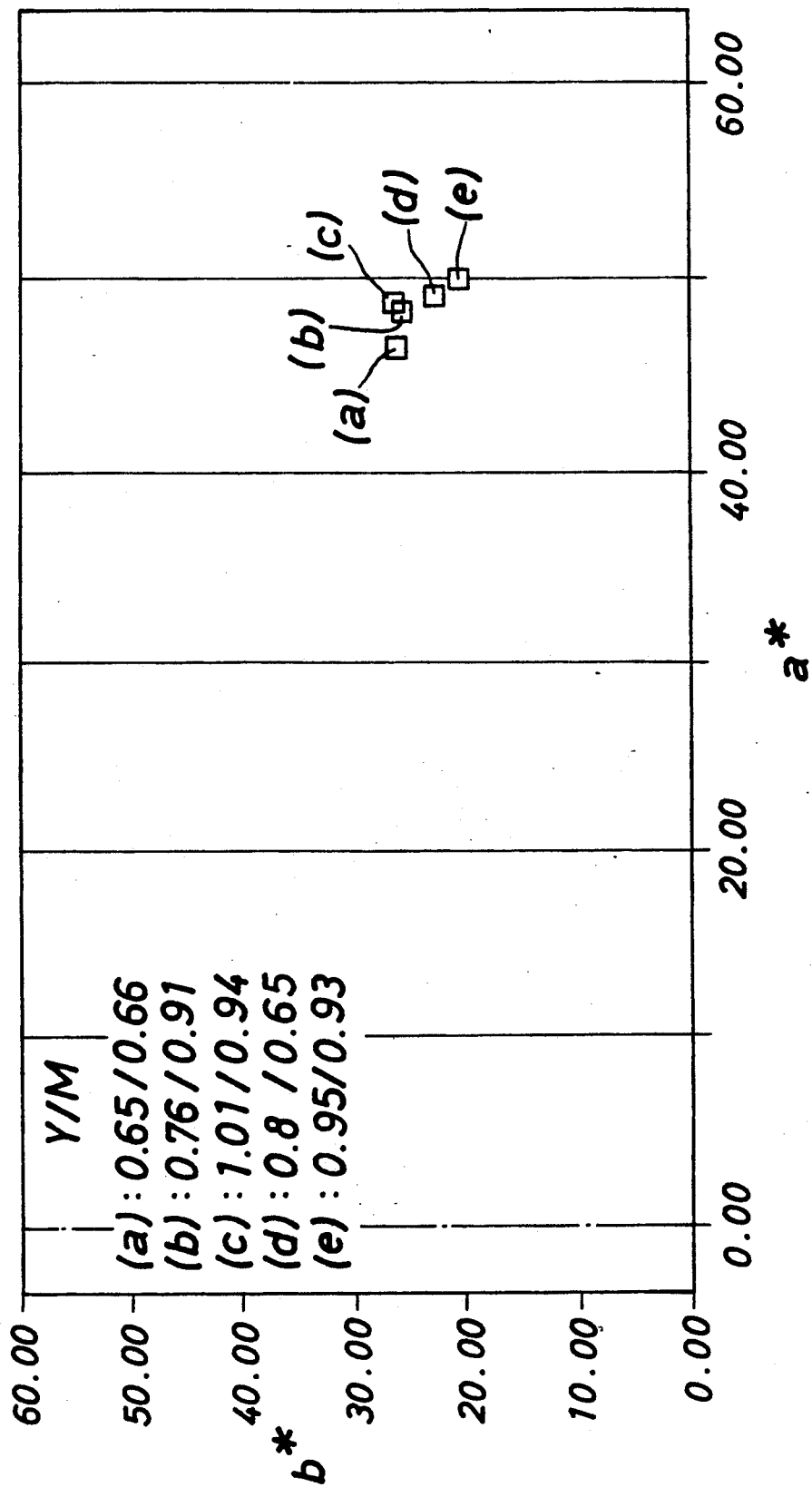
FIG. 13 is a graph showing a chromaticity distribution obtained when red is reproduced by subtractive color mixture using yellow and magenta toners.

FIG. 13 is a graph showing a color distribution obtained when red is reproduced by subtractive color mixture of yellow and magenta toners.

Referring to the graph in FIG. 13, reference symbol (a) denotes a chromaticity value obtained when red is reproduced by using the yellow and magenta toners in toner attaching amounts of 0.65 mg/cm$^2$ and 0.66 mg/cm$^2$, respectively; (b), a chromaticity value obtained when red is reproduced by using the yellow and magenta toners in toner attaching amounts of 0.76 mg/cm$^2$ and 0.91 mg/cm$^2$, respectively; (c), a chromaticity value obtained when red is reproduced by using the yellow and magenta toners in toner attaching amounts of 1.01 mg/cm$^2$ and 0.94 mg/cm$^2$, respectively; (d), a chromaticity value obtained when red is reproduced by using the yellow and magenta toners in toner attaching amounts of 0.8 mg/cm$^2$ and 0.65 mg/cm$^2$, respectively; and (e) a chromaticity value obtained when red is reproduced by using the yellow and magenta toners in toner attaching amounts of 0.95 mg/cm$^2$ and 0.93 mg cm$^2$, respectively. All the chromaticity values(a) to (e) are distributed near a* of 50.00 and b* of 25.00. In consideration of chromaticity differences, the toner attaching amounts of both the yellow and magenta toners fall within the range of 0.6 to 1.0 mg/cm$^2$.

In the color image forming method of this embodiment, the toner attaching amount is preferably set to about 0.8 mg/cm$^2$ in consideration of chromaticity differences and image densities.

Figure 14:
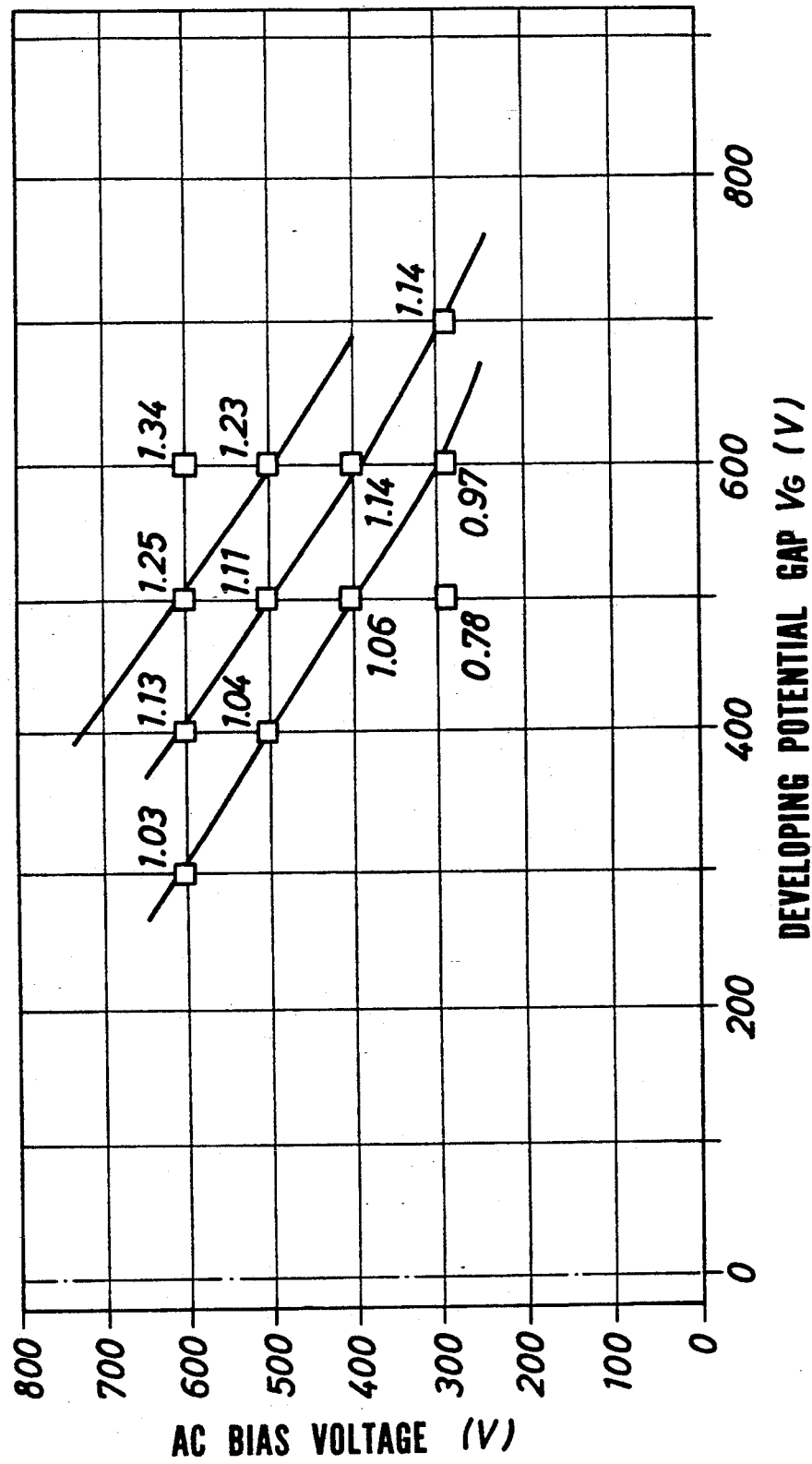
FIG. 14 is a graph showing chromaticities obtained when color reproduction is performed by subtractive color mixture using yellow and magenta toners.

A DC developing bias to obtain a proper toner attaching amount under an arbitrary AC bias is obtained. FIG. 14 shows data representing the developing properties of a toner, which is obtained by an experiment conducted by the present inventor. FIG. 14 is a graph showing a relationship between a developing potential gap $V_G$ and a toner attaching amount under an arbitrary AC bias.

According to the graph, in order to obtain a toner attaching amount of 1.0 mg/cm$^2$ or more at an AC developing bias having a frequency of 5 kHz and a voltage of 600 V, a developing potential gap of 300 V or more is required. In this embodiment, a preferable value of the developing potential gap $V_G$ is about 300 V. In the present invention, a preferable DC developing bias $V_{DC}$ is obtained by adding a voltage of about 300 V corresponding to the developing potential gap to a toner layer potential after re-charging and exposure.

Figure 15:
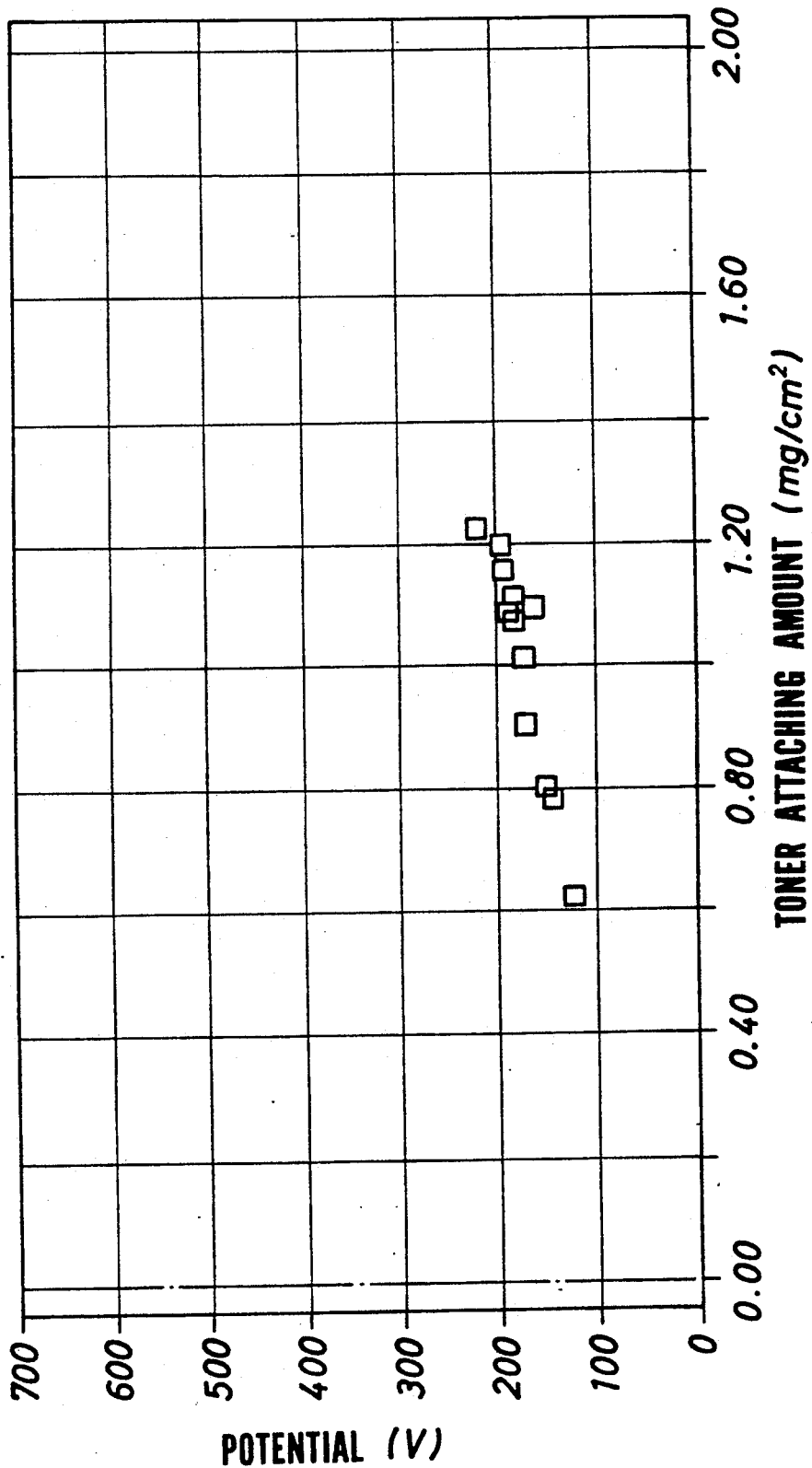
FIG. 15 is a graph showing a relationship between a yellow toner attaching amount and a corresponding potential.

FIG. 15 is a graph showing a relationship between a yellow toner attaching amount and its potential, which is obtained by an experiment conducted by the present inventors.

A developing agent used in the experiment is a two-component developing agent having a toner concentration of 7% and consisting of toner particles having a charge amount of $12 \times 10^{-6}$ C/g and a particle size of $14 \times 10^{-6}$ m and carrier particles having a particle size of $40 \times 10^{-6}$ m.

Referring to the graph, when the toner is attracted to the photosensitive body in an amount of 1.0 mg/cm$^2$ by a first developing operation, and exposure is performed at a laser power of 0.7 mW/cm$^2$ after re-charging, a toner layer potential of about 200 V is obtained. A preferable DC developing bias $V_{DC}$ in this embodiment is about 500 V. When a toner layer is formed by performing a developing operation using a magenta toner, the first layer of the yellow toner and the second layer of the magenta toner have the same thickness, and hence red can be produced without color correction.

Figure 16:
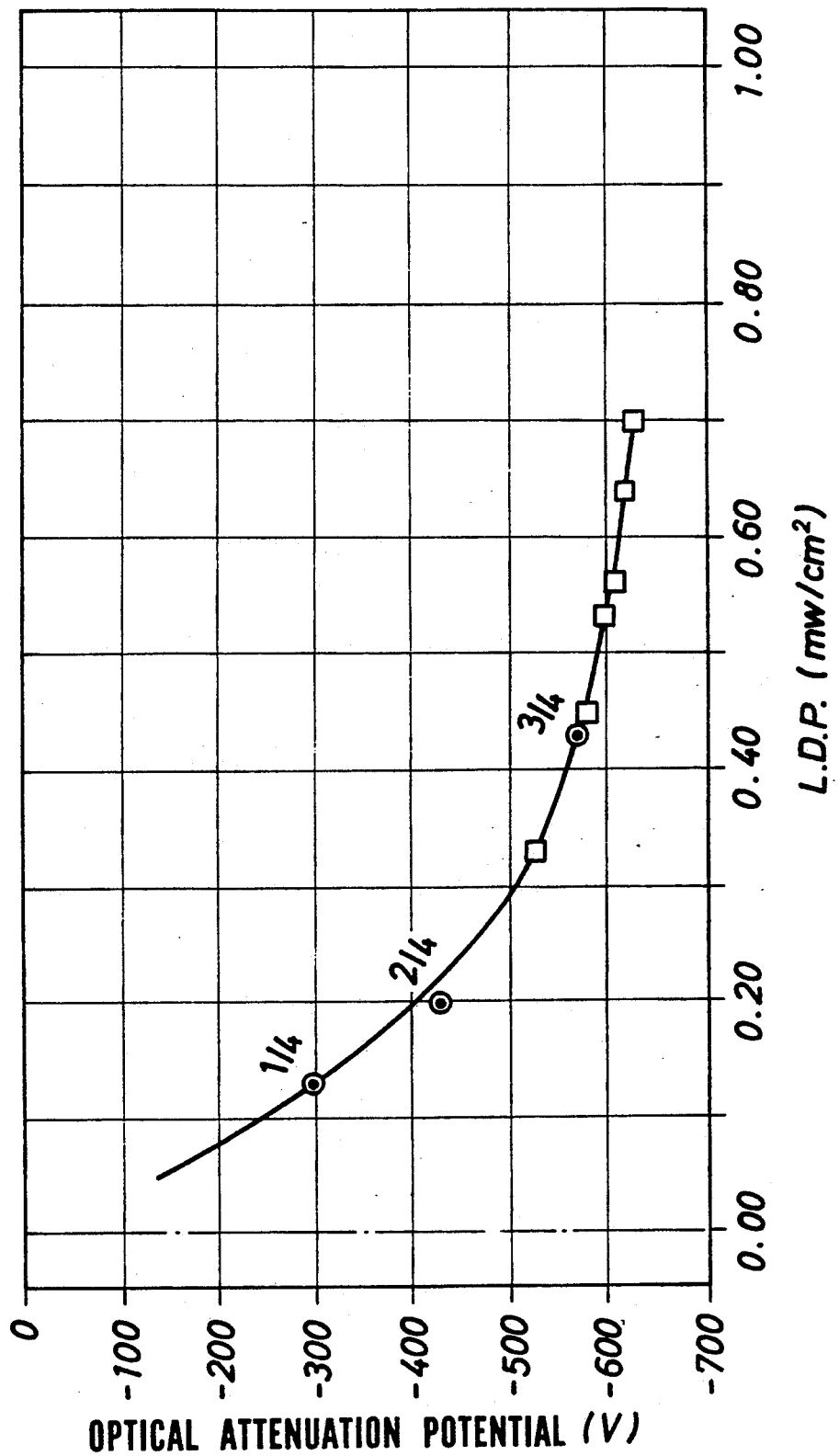
FIG. 16 is a graph showing the performance of a photosensitive body, i.e., a relationship between an exposure potential and laser power established when a photosensitive body surface potential is displaced upon radiation of a laser beam.

FIG. 16 is a graph showing a relationship between an exposure potential, which is set when the performance of the photosensitive body used in this embodiment, i.e., the photosensitive body surface potential, is displaced by radiation of a laser beam, and corresponding laser power. The graph shows photosensitive body surface potentials obtained when the photosensitive body is uniformly charged at about $-650$ V upon scorotron discharging, and is irradiated with a laser beam from a laser exposure unit while the laser power is changed.

Referring to the graph, when image exposure is performed by using a laser beam of 0.70 mW/cm$^2$, the surface potential of the photosensitive body is increased to about 30 V and hence is displaced by 620 V. When image exposure is performed by using a laser beam of 0.42 mW/cm$^2$, the surface potential of the photosensitive body is increased to about 80 V and hence is displaced by about 570 V. Similarly, with a laser beam of 0.20 mW/cm$^2$, the surface potential is increased to about 230 V and is displaced by about 420 V. With a laser beam of 0.18 mW/cm$^2$, the surface potential is increased to about 350 V and is displaced by about 300 V. Therefore, the laser power of the laser exposure unit is preferably set to radiate a laser beam of about 0.18 mW/cm$^2$ for first exposure and to radiate a laser beam of about 0.42 mW/cm$^2$ or more for re-exposure.

As described above, according to the color image forming method of the present invention, the first exposure potential and the second and subsequent exposure potentials can be set to be equal to each other regardless of the number of times of image exposing operations by changing the intensity of light to be radiated from the exposure means or the exposure time in units of pixels in accordance with the number of times of formation of latent images. Therefore, if the developing bias is set to be constant in the same image forming process, substantially the same developing potential gap can be obtained.

Process conditions in the color image forming method of the present invention will be described below. The toner attaching amount is preferably set to be about 0.8 mg/cm$^2$ in consideration of chromaticity differences and image densities. The developing potential gap $V_G$ to obtain this attaching amount of about 0.8 mg/cm$^2$ is preferably set to be about 300 V. A toner layer obtained by attaching toner particles having a charge amount of $12 \times 10^{-6}$ C/g and a particle size of $14 \times 10^{-6}$ m to the photosensitive body surface in an amount of about 1.0 mg/cm$^2$ has a potential of about 200 V. In the color image forming method of this embodiment, the DC developing bias $V_{DC}$ requires a potential obtained by adding a toner layer potential (about 200 V) after re-charging and exposure to a voltage of about 300 V corresponding to the developing potential gap. Therefore, the DC developing bias $V_{DC}$ is preferably set to be about 500 V.

Figure 17:
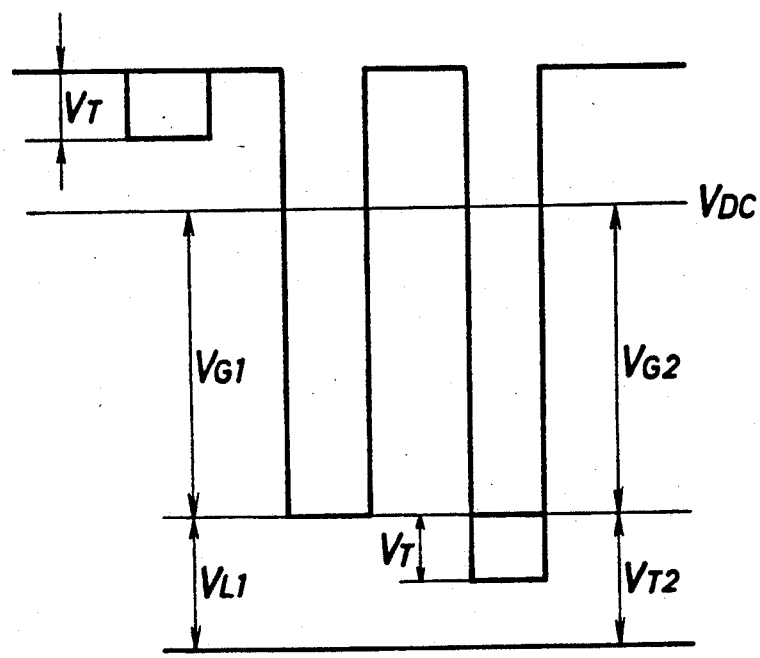
FIG. 17 is a graph showing a potential distribution on a photosensitive body surface obtained when a color image is formed by the color image forming process of the present invention.

FIG. 17 is a graph showing the surface potential of the photosensitive body after re-charging and exposure in a case wherein toner images are caused to overlap under the above-described process conditions.

Referring to FIG. 17, reference symbol $V_H$ denotes a photosensitive body surface potential obtained when uniform charging is performed by uniformly distributing charges on the photosensitive body surface upon scorotron discharging by means of a scorotron charger; $V_T$, a potential difference due to the charge amount of a toner layer formed on the photosensitive body surface upon first developing; $V_{PC}$, a DC developing bias applied to a developing sleeve; $V_{G1}$, a developing potential gap as a potential difference between a first exposure potential $V_{L1}$ upon first image exposure and the DC developing bias $V_{DC}$; and $V_{G2}$, a developing potential gap as a potential difference between a surface potential $V_{T2}$ of a toner layer upon second exposure and the DC developing bias $V_{DC}$. The first developing potential gap $V_{G1}$ and the second developing potential gap $V_{G2}$ can be set to be equal by matching the first exposure potential with the toner layer surface potential upon second latent image formation by changing the intensity of light from the exposure means or the exposure time. With this operation, a plurality of color toner layers formed on the photosensitive body surface have a uniform thickness, and hence color reproduction can be performed without color correction.

The color image forming method of the present invention is executed by the image exposure unit shown in FIG. 9. Data shown FIG. 18 are written in the LUT 27'.

Input data is a six-bit digital code consisting of a four-bit digital code of color image data Y, M, C, and BK constituting one pixel, and a two-bit digital code corresponding to color selection signals Se1 and Se0 for selecting color image data for forming an electrostatic latent image. Color image data are color data for reproducing the color of one pixel. When color image data of a certain color component is "1", it means that a corresponding pixel includes the color component. When it is "0", it means that the color component is not included. Color selection signals are data indicating color image data to be used to form a latent image. When the value of this data is "00", it means that the color image data Y is selected. When it is "01", it means that the color image data M is selected. When it is "10", it means that the color image data C is selected. When it is "11", it means that the color image data BK is selected. Output data is drive data for driving the laser driver 22.

In the color image forming method of the present invention, yellow, magenta, and cyan toners transmit infrared rays, whereas a black toner does not transmit infrared rays. Developing is sequentially performed by using the yellow, magenta, cyan, and black toners in the order named. The characteristic feature of the color image forming method of this embodiment is that the laser power of a laser beam to be radiated from the laser exposure unit so as to perform the first latent image formation operation (also called image exposure) is set to be not more than ½ that of a laser beam to be radiated to perform second and subsequent latent image formation operations (image exposure). sure). More specifically, the laser power for a first image exposure is 0.2 mW/cm$^2$, and the laser power for second and subsequent image exposures is set to be 0.40 mW/cm$^2$ or more. Note that when image exposure is to be performed by using the color image data BK, the laser power is set to be 0.20 mW/cm$^2$ for all image exposure operations. Assume that image exposure is performed on the basis of the color image data Y and BK (i.e., the color selection signals are set to be "00" and "11"). In this case, since the laser power of a laser beam to be radiated from the laser exposure unit is set to be 0.20 mW/cm$^2$ for all exposure operations, the output data is set to be $F_W \times \frac{1}{2}$. Assume that image exposure is to be performed on the basis of the color image data M i.e., the color selection signals are set to be "01"). In this case, if the color image data Y is "0", the output data is $F_W \times \frac{1}{2}$. If the color image data Y is "1", the output data is set to be $F_W$. Assume that image exposure is performed on the basis of the color image data C (i.e., the color selection signals are "10"). In this case, if the color image data Y and M are "0", the output data is $F_W \times \frac{1}{2}$. If the color image data Y or M is "1", the output data is set to be $F_W$.

An image forming process of the color image forming method of the present invention will be described blow.

Process conditions in the color image forming method in this embodiment will be described below. The toner attaching amount is preferably set to be about 0.8 mg/cm$^2$ in consideration of chromaticity differences and image densities. The developing potential gap $V_G$ to obtain this toner attaching amount of about 0.8 mg/cm$^2$ is preferably set to be about 300 V. A toner layer obtained by attaching toner particles having a charge amount of $12 \times 10^6$ C/g and a particle size $14 \times 10^{-6}$ m to the photosensitive body surface in an about of about 1.0 mg/cm² has a potential of about 200 V. In the color image forming method of this embodiment the DC developing bias $V_{DC}$ requires a potential obtained by adding a voltage of about 300 V corresponding to the developing potential gap to a toner layer potential (about 200 V) after re-charging and exposure. Therefore, the DC developing bias $V_{DC}$ is preferably set to be about 500 V.

When a magenta toner layer is formed by performing a developing operation using the magenta toner, the first yellow toner layer and the second magenta yellow toner have the same thickness, and hence red can be reproduced without color correction.

The laser power of the laser exposure unit is preferably set to radiate a laser beam of about 0.18 mW/cm² for the first image exposure and to radiate a laser beam of about 0.42 mW/cm² or more for re-exposure.

As described above, according to the color image forming method of the present invention, the first exposure potential and the second and subsequent exposure potentials can be set to be equal to each other regardless of the number of times of image exposing operations by changing the intensity of light to be radiated from the exposure means or the exposure time in units of pixels in accordance with the number of times of formation of latent images. Therefore, if the developing bias is set to be constant in the same image forming process, substantially the same developing potential gap can be obtained.

Assume that image exposure is performed by a laser beam from an image exposure unit 2, and electrostatic latent images corresponding to the respective colors are formed on a photosensitive body 1. Of the electrostatic latent images corresponding to the respective colors, the electrostatic latent image corresponding to yellow is formed upon radiation of a laser beam modulated in accordance with yellow data. The electrostatic latent image corresponding to yellow is developed by a first developing unit 4a, and a first toner image (yellow toner image) is formed on the photosensitive body 1. The first toner image on the photosensitive body 1 is charged again by a scorotron charger 3 without being transferred onto a recording sheet P.

Subsequently, the laser beam is modulated in accordance with magenta data and is radiated on the photosensitive body 1 so as to form an electrostatic latent image. The electrostatic latent image is developed by a second developing unit 4b, and a second toner image (magenta toner image) is formed. In the same manner as described above, electrostatic latent images are sequentially developed by third and fourth developing units 4c and 4d so as to form a third toner image (cyan toner image) and a fourth toner image (black toner image). These toner images are sequentially stacked on the photosensitive body 1 to form a four-color image.

After the photosensitive body is discharged by a discharge lamp, this four-color image is re-charged by the scorotron charger 3 in the same manner as described above, and is transferred onto the recording sheet P supplied from a paper feeder by means of a transfer electrode 7.

The recording sheet P which carries the transferred toner image is separated from the photosensitive body 1 by a separation electrode 8, and is conveyed to a fixing roller 31 through a guide and a conveyor belt. The image is then fixed upon heating and is discharged onto a paper discharge plate.

After the transfer operation is completed, the photosensitive body 1 is discharged by a discharger 11 which was not used during the toner image forming operation. Thereafter, the residual toner on the surface of the photosensitive body 1 is removed by a blade 12a, a bias roller 12b, and a cleaning roller 12c of a cleaning unit 12 which has been in an inoperative state during the toner image forming operation. With this operation, the apparatus is set to be ready for the next multiple color image formation.

According to the present invention, the first exposure potential and the second and subsequent exposure potentials can be set to be equal to each other regardless of the number of times of image exposing operations by matching the first exposure potential with a re-exposure potential. That is, if the developing bias is set to be constant in the same image forming process, substantially the same developing potential gap can be obtained. Therefore, a plurality of toner layers to be overlapped can be uniformly formed.

In addition, the laser power of a laser beam for the first image exposure, which is radiated from the exposure means, is set to be 50% or less of the laser power of a laser beam for re-exposure so that the first exposure potential and the re-exposure potential are set to be equal. Since the first exposure potential and the second and subsequent exposure potentials can be set to be equal to each other regardless of the number of times of image exposure, a plurality of toner layers to be overlapped can be uniformly formed.

What we claim is:

1. A color image forming apparatus comprising:
   image data storing means for storing color image data for a plurality of colors;
   image data converting means for converting the color image data for the plurality of colors into corrected color image data for each color in a predetermined color sequence;
   means for irradiating a laser light onto a photosensitive surface on the basis of said corrected color image data to successively create an exposure potential and thereby form a latent image for each color in the predetermined color sequence; and
   means for maintaining a substantially constant developing bias so that a first exposure potential of the photosensitive surface and a second exposure potential of the photosensitive surface are substantially equal to one another, wherein the second exposure potential is provided while an image formed by developing a latent image formed by the first exposure potential is present on the photosensitive surface.

2. The color image forming apparatus according to claim 1 wherein said color image data for a plurality of colors include image data for a least red, green, and blue and said corrected color image data include image data for at least yellow, magenta, and cyan.

3. The color image forming apparatus according to claim 2 wherein said corrected color image data further include image data for black.

4. A color image forming method for forming color images comprising selecting color image data of monocolor from color image data of a plurality of colors, irradiating a laser light onto a uniformly electrically charged photosensitive surface on the basis of the selected color image data to form a latent image on said photosensitive surface and developing said latent image to form toner images of a plurality of colors sequentially characterized by that exposure potential provided by a first image exposure is equalized substantially to a surface potential of a toner layer provided by exposure on the toner layer by modulation of light intensity of said laser light.

5. The color image forming method according to claim 4 wherein a laser power for the first image exposure is less than 50 percent of a laser power for the image exposure on the toner layer.

6. The color image forming apparatus to claim 1 further comprising means for transmitting the color image data for the plurality of colors in parallel from the image data storing means to the image data converting means.

7. The color image forming apparatus according to claim 1 wherein the means for maintaining a substantially constant developing bias includes means for adjusting the intensity of the laser light on the basis of said corrected color image data output from said image data converting means.

8. The color image forming apparatus according to claim 7 wherein the means for adjusting the intensity of the laser light adjusts the intensity of the laser light so that the intensity of the laser light irradiated onto the photosensitive surface to create the first exposure potential is less than 50 percent of the intensity of the laser light irradiated onto the photosensitive surface to create the second exposure potential.

9. A color image forming apparatus comprising:
image data storing means for storing color image data for a plurality of colors;
image data converting means for converting the color image data for the plurality of colors into color image data for mono-color in a predetermined color sequence;
means for irradiating a laser light onto a photosensitive surface on the basis of said color image data of mono-color, which has been transmitted in parallel from the image data converting means, to successively create an exposure potential and thereby form a latent image for each color in the predetermined color sequence, wherein a substantially constant developing bias is maintained so that a first exposure potential of the photosensitive surface and a second exposure potential of the photosensitive surface are substantially equal to one another, wherein the second exposure potential is provided while an image formed by developing a latent image formed by the first exposure potential is present on the photosensitive surface;
means for transmitting color image data for mono-color, which color image data forms a pixel, simultaneously in parallel from the image data converting means to the irradiating means; and
means for developing the latent image for each color in the predetermined color sequence to form toner images of a plurality of colors.

10. The color image forming apparatus according to claim 9 wherein said color image data for a plurality of colors include image data for at least red, green, and blue and said color image data of mono-color include image data for at least yellow, magenta, and cyan.

11. The color image forming apparatus according to claim 10 wherein said color image data of mono-color further include image data for black.

12. The color image forming apparatus according to claim 9 wherein the means for maintaining a substantially constant developing bias includes means for adjusting the intensity of the laser light on the basis of said color image data of mono-color output from said image data converting means.

13. The color image forming apparatus according to claim 12 wherein the means for adjusting the intensity of the laser light adjusts the intensity of the laser light so that the intensity of the laser light irradiated onto the photosensitive surface to create the first exposure potential is less than 50 percent of the intensity of the laser light irradiated onto the photosensitive surface to create the second exposure potential.

* * * * *

UNITED STATES PATENT AND TRADEMARK OFFICE
CERTIFICATE OF CORRECTION

PATENT NO. : 5,184,146
DATED : February 02, 1993
INVENTOR(S) : Kazuyoshi Tanaka et al.

It is certified that error appears in the above-identified patent and that said Letters Patent is hereby corrected as shown below:

Claim 2, column 16, line 55, change "a least" to --at least--.

Signed and Sealed this

Fourteenth Day of December, 1993

Attest:

BRUCE LEHMAN

Attesting Officer   Commissioner of Patents and Trademarks